(12) United States Patent
Huang et al.

(10) Patent No.: US 11,329,267 B2
(45) Date of Patent: May 10, 2022

(54) HEAT TREATMENT OF WHOLE CELL STRUCTURES

(71) Applicant: ENEVATE CORPORATION, Irvine, CA (US)

(72) Inventors: Qian Huang, San Diego, CA (US); Benjamin Park, Mission Viejo, CA (US); Ian Browne, Orange, CA (US); Rahul Kamath, Misssion Viejo, CA (US); David J. Lee, Irvine, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 16/681,597

(22) Filed: Nov. 12, 2019

(65) Prior Publication Data
US 2021/0143393 A1 May 13, 2021

(51) Int. Cl.
| | |
|---|---|
| *H01M 4/04* | (2006.01) |
| *H01M 4/134* | (2010.01) |
| *H01M 4/1395* | (2010.01) |
| *H01M 4/62* | (2006.01) |
| *H01M 10/0525* | (2010.01) |
| *H01M 10/0562* | (2010.01) |
| *H01M 4/38* | (2006.01) |
| *H01M 4/02* | (2006.01) |

(52) U.S. Cl.
CPC ......... *H01M 4/0471* (2013.01); *H01M 4/043* (2013.01); *H01M 4/0404* (2013.01); *H01M 4/0435* (2013.01); *H01M 4/134* (2013.01); *H01M 4/1395* (2013.01); *H01M 4/386* (2013.01); *H01M 4/622* (2013.01); *H01M 4/625* (2013.01); *H01M 10/0525* (2013.01); *H01M 10/0562* (2013.01); *H01M 2004/027* (2013.01); *H01M 2300/0068* (2013.01); *H01M 2300/0071* (2013.01)

(58) Field of Classification Search
None
See application file for complete search history.

(56) References Cited

U.S. PATENT DOCUMENTS

| | | | |
|---|---|---|---|
| 6,451,480 B1 | 9/2002 | Gustafson et al. | |
| 6,534,219 B1 | 3/2003 | Iijima et al. | |
| 7,273,503 B2 * | 9/2007 | Sada | H01M 10/0525 29/623.1 |
| 2007/0122714 A1 | 5/2007 | Suzuki et al. | |
| 2008/0241665 A1 * | 10/2008 | Sano | H01M 10/0562 429/149 |

(Continued)

OTHER PUBLICATIONS

International Search Report and Written Opinion for PCT/US2020/58308, dated Feb. 2, 2021, 10 pages.

*Primary Examiner* — Daniel S Gatewood
(74) *Attorney, Agent, or Firm* — McAndrews, Held & Malloy, Ltd.

(57) ABSTRACT

Systems and methods are provided for heat treatment of whole cell structures. A battery may be formed based on applying of heat treatment to a whole cell composition that includes, at least, both anode material and cathode material, such that the anode material and the cathode material are heat treated at the same time. The heat treatment may include pyrolysis. The whole cell composition, and the corresponding cell formed based thereon, may include solid state electrolyte.

10 Claims, 8 Drawing Sheets

(56) References Cited

U.S. PATENT DOCUMENTS

| | | | |
|---|---|---|---|
| 2009/0136830 A1* | 5/2009 | Gordon | H01M 10/052 |
| | | | 429/50 |
| 2009/0197177 A1 | 8/2009 | Teramoto | |
| 2009/0226816 A1* | 9/2009 | Yoshida | C04B 35/447 |
| | | | 429/304 |
| 2013/0106029 A1* | 5/2013 | Snyder | H01M 4/043 |
| | | | 264/571 |
| 2014/0099556 A1 | 4/2014 | Johnson et al. | |

* cited by examiner

HEAT TREATMENT OF WHOLE CELL STRUCTURES

TECHNICAL FIELD

Aspects of the present disclosure relate to energy generation and storage. More specifically, certain implementations of the present disclosure relate to methods and systems for heat treatment of whole cell structures.

BACKGROUND

Various issues may exist with conventional battery technologies. In this regard, conventional systems and methods, if any existed, for designing and making battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for heat treatment of whole cell structures, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
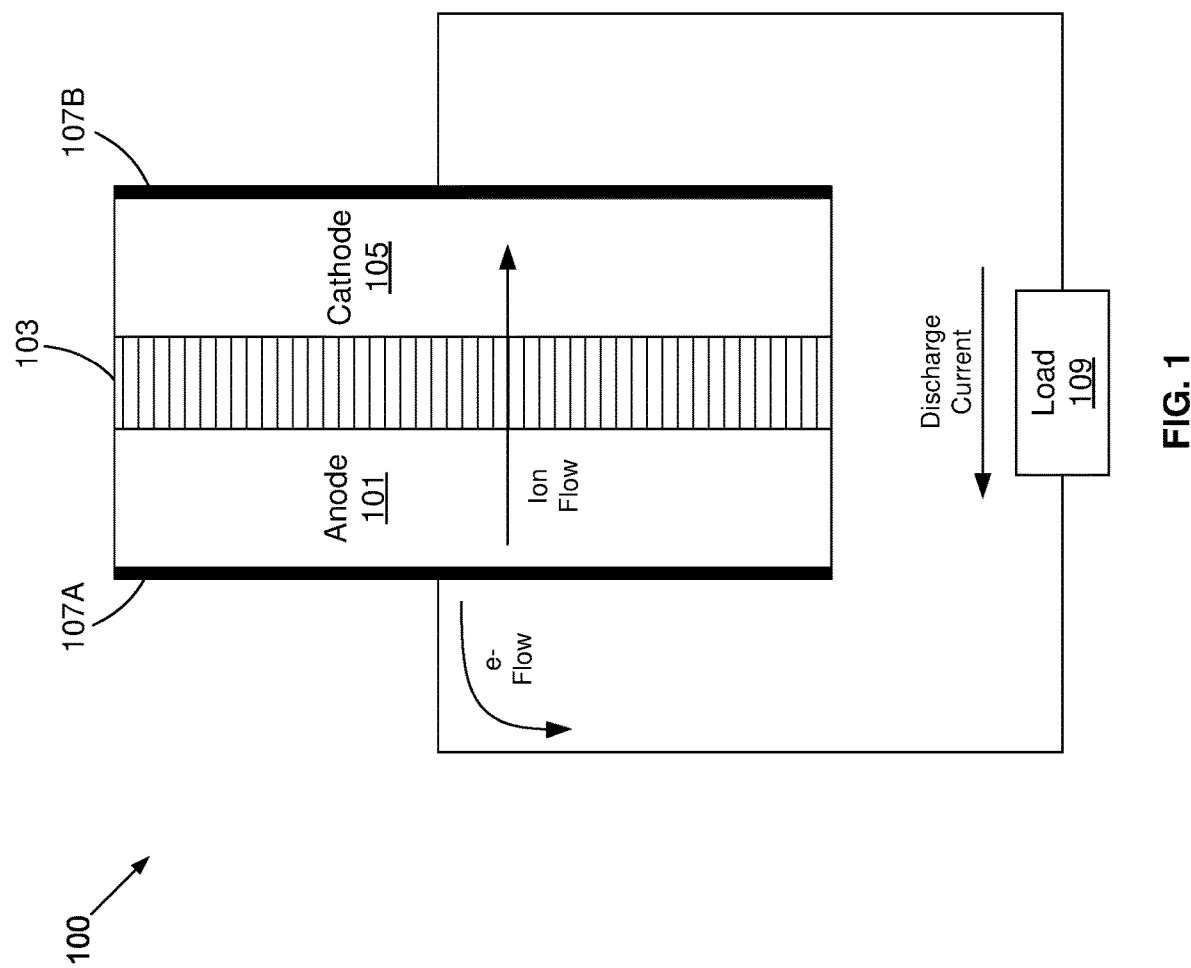
FIG. 1 is a diagram of a battery with silicon-dominated anode.

FIG. 1 is a diagram of a battery with silicon-dominated anode. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super P), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

In conventional and existing solutions, the electrodes are made separately, with the cells then being formed using these separately-made electrodes. Making the electrodes entails applying one or more heat treatment processes to the material, including pyrolysis, for example. It may be advantageous, however, to utilize a process in which the electrodes are heat treated (particularly pyrolyzed) at the same time—that is, performing the cell heat treatment (or backing of the cell) in one step. This may be referred as "whole cell processing."

In this regard, with whole cell processing, a whole cell system (or structure) that comprises at least the anode and the cathode (but typically comprising additionally at least the separator) is subjected to a single heat treatment (e.g., pyrolysis process), such that both electrode (and, optionally, additional components of the cell) are heat treated at the same time, using a single heat treatment process (e.g., a single pyrolysis process). Such heat treatment causes material whole cell structure to change, such as to facilitate converting precursor material into active material. For example, a whole cell structure may comprise separator, anode, and cathode precursors (e.g., slurries), which may be heat treated (e.g., in suitable furnace) at the same time. Further, in various implementations solid state electrolytes may be used in cells manufactured using whole cell processing. This may be achieved by using, e.g., in the whole cell structure electrodes that comprise a ceramic/polymeric matrix with solid state electrolyte (e.g., solid electrolyte powders) incorporated into it).

Use of whole cell processing may offer various benefits compared to existing solutions. For example, whole cell processing may be more cost-effective, due to reduced complexity, shortened and simplified manufacture process, and small variety of material (more common material for the various components). In addition, whole cell processing may yield cells with improved performance (e.g., improved cycle life). Further, whole cell processing (and the resulting cells formed in this manner) may improve safety (e.g., due to use of less flammable material). The benefits of whole cell processing, and example of such processes are described in more detail with respect to FIGS. 5-8.

Figure 2:
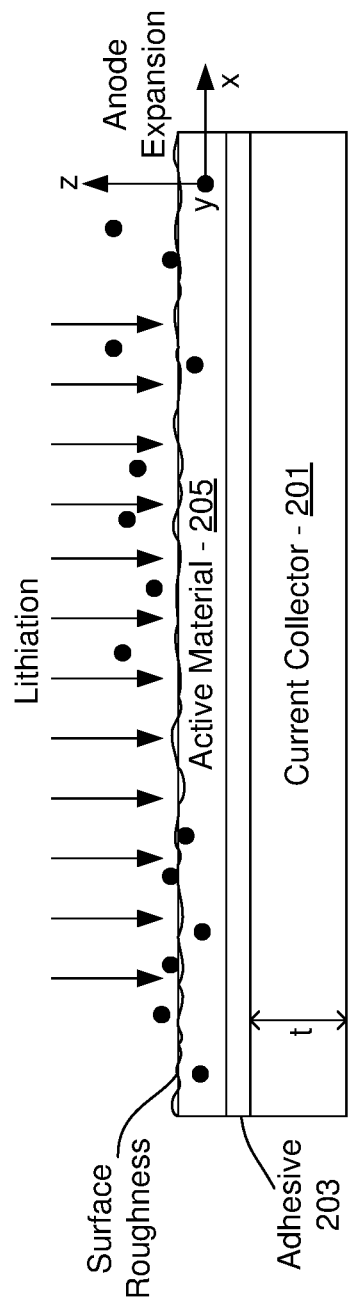
FIG. 2 illustrates an example silicon-dominant anode.

FIG. 2 illustrates an example silicon-dominant anode. Referring to FIG. 2, there are shown a current collector 201, an optional adhesive 203, and an active material 205. It should be noted, however, that the adhesive 203 may or may not be present depending on the type of anode fabrication process utilized, as the adhesive is not necessarily there in a direct coating process where the active material is formed directly on the current collector.

In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. As illustrated in FIG. 2, the current collector 201 has a thickness t, which may vary based on the particular implementation. In this regard, in some implementations thicker foils may be used while in other implementations thinner foils are used. Example thicker foils may be greater than 6 μm, such as 10 μm or 20 μm for copper, for example, while thinner foils may be less than 6 μm thick in copper In an example scenario, when an adhesive is used, the adhesive 203 comprises a polymer such as polyimide (PI), polyamide-imide (PAI), Polyacrylic acid (PAA), or Polyvinylidene fluoride (PVDF), which provides adhesive strength of the active material film 205 to the current collector 201 while still providing electrical contact to the current collector 201. Other adhesives may be utilized depending on the desired strength, as long as they can provide adhesive strength with sufficient conductivity following processing.

Typically, electrodes (such as the silicon-dominant anode shown in FIG. 2) are made separately, and the cells (or batteries) are then formed using these already-made electrodes. It may be advantageous, however, to utilize a process in which the whole cell system (including cathode, separator, and anode) is made at the same time. In this regard, in whole cell processing performed in accordance with the present disclosure, a specialized heat treatment (e.g., pyrolysis) process is applied to the whole cell system—i.e., cell matrix that includes the cathode, the separator, and the anode—at the same time, such that all these components may be heat treated at the same time. This is described in more detail with respect to FIGS. 5-8.

Figure 3:
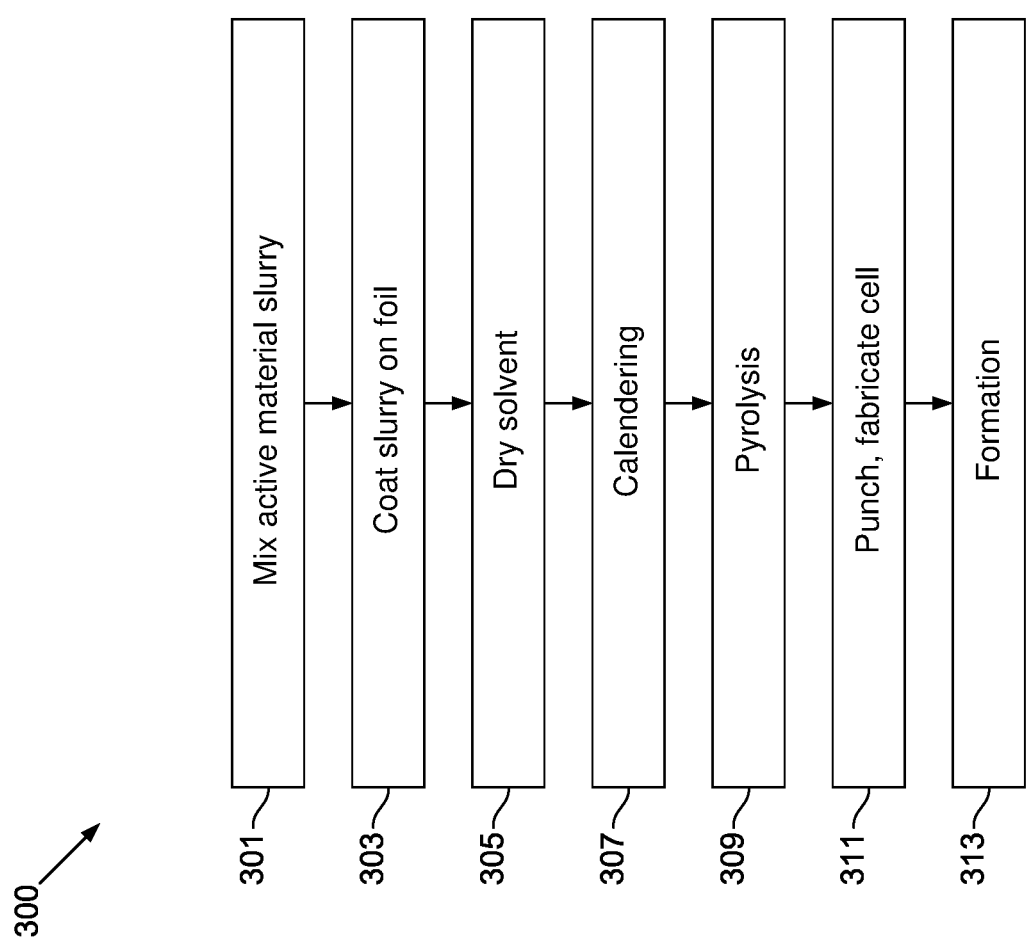
FIG. 3 is a flow diagram of a process for direct coating electrodes.

FIG. 3 is a flow diagram of a process for direct coating electrodes. This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI, Polyacrylonitrile (PAN), and mixtures and combinations thereof. Another example process comprising forming the active material on a substrate and then transferring to the current collector is described with respect to FIG. 4.

In step 301, the raw electrode active material may be mixed using a binder/resin (such as PI, PAI), solvent, and conductive carbon. For example, graphene/VGCF (1:1 by weight) may be dispersed in NMP under sonication for, e.g., 1 hour followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 1000 rpm in a ball miller for a designated time, and then the conjugated carbon/NMP slurry may be added and dispersed at, e.g., 2000 rpm for, e.g., another predefined time to achieve a slurry viscosity within 2000-4000 cP and a total solid content of about 30%. The particle size and mixing times may be varied to configure the active material density and/or roughness.

In step 303, the slurry may be coated on the foil at a loading of, e.g., 3-4 mg/cm$^2$, which may undergo drying in step 305 resulting in less than 15% residual solvent content. In step 307, an optional calendering process may be utilized where a series of hard pressure rollers may be used to finish the film/substrate into a smoother and denser sheet of material.

In step 309, the active material may be pyrolyzed by heating to 400-800° C. such that carbon precursors are partially or completely converted into glassy carbon. The pyrolysis step may result in an anode active material having silicon content greater than or equal to 50% by weight, where the anode has been subjected to heating at or above 400° C. Pyrolysis can be done either in roll form or after punching in step 311. If done in roll form, the punching is done after the pyrolysis process. The punched electrode may then be sandwiched with a separator and cathode with electrolyte to form a cell.

In step 313, the cell may be subjected to a formation process, comprising initial charge and discharge steps to lithiate the anode, with some residual lithium remaining.

Figure 4:
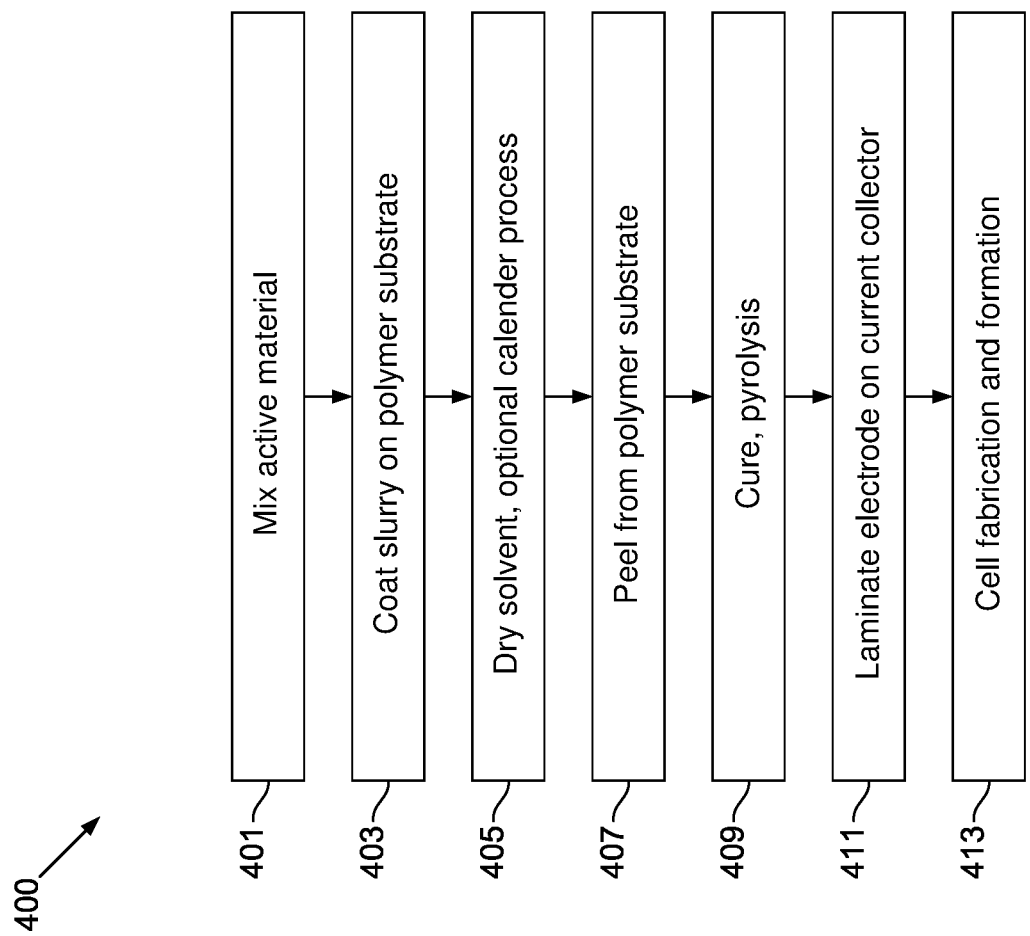
FIG. 4 is a flow diagram of an alternative process for transfer lamination of electrodes.

The process shown in FIG. 3 may be used for making electrodes separately—that is, for making one of the anode or cathode using direct coating (with the other electrode being made separately, using the same direct coating process, or another process —such as transfer lamination as describe with respect to FIG. 4). The whole cell may the formed using these separately-made electrodes. It may be advantageous, however, to utilize a process in which the whole cell system (including cathode, separator, and anode) is made at the same time. In this regard, direct coating based whole cell processing may be used, in which direct coating based pyrolysis process may be applied to whole cell matrix—including the anode, the separator, and the cathode—at the same. An example of such process is shown and described with respect to FIGS. 5 and 7.

FIG. 4 is a flow diagram of an alternative process for transfer lamination of electrodes. While the previous process to fabricate composite anodes employs a direct coating process, this process physically mixes the active material, conductive additive, and binder together coupled with peeling and lamination processes.

This process is shown in the flow diagram of FIG. 4, starting with step 401 where the active material may be mixed with a binder/resin such as polyimide (PI) or polyamide-imide (PAI), solvent, the silosilazane additive, and optionally a conductive carbon. As with the process described in FIG. 4, graphene/VGCF (1:1 by weight) may be dispersed in NMP under sonication for, e.g., 45-75 minutes followed by the addition of Super P (1:1:1 with VGCF and graphene) and additional sonication for, e.g., 1 hour. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 403, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 405. An optional calendering process may be utilized where a series of hard pressure rollers may be used to finish the film/substrate into a smoothed and denser sheet of material.

In step 407, the green film may then be removed from the PET, where the active material may be peeled off the polymer substrate, the peeling process being optional for a polypropylene (PP) substrate, since PP can leave 2% char residue upon pyrolysis. The peeling may be followed by a cure and pyrolysis step 409 where the film may be cut into sheets, and vacuum dried using a two-stage process (100-140° C. for 15 h, 200-240° C. for 5 h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400° C.

In step 411, the pyrolyzed material may be flat press or roll press laminated on the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 413, the electrode may then be sandwiched with a separator and cathode with electrolyte to form a cell. The cell may be subjected to a formation process, comprising initial charge and discharge steps to lithiate the anode, with some residual lithium remaining. The expansion of the anode may be measured to confirm reduced expansion and anisotropic nature of the expansion. The larger silicon particle size results in a rougher surface, higher porosity and less dense material, which reduces the expansion of the active material during lithiation.

The process shown in FIG. 4 may be used for making electrodes separately—that is, for making one of the anode or cathode using transfer lamination (with the other electrode being made separately, using the same transfer lamination process, or another process—such as direct coating, as describe with respect to FIG. 3). The whole cell may the formed using these separately-made electrodes. It may be advantageous, however, to utilize a process in which the whole cell system (including cathode, separator, and anode) is made at the same time. In this regard, transfer lamination based whole cell processing may be used, in which transfer lamination based heat treatment (e.g., pyrolysis process) may be applied to whole cell matrix—including the anode, the separator, and the cathode—at the same. An example of such process is shown and described with respect to FIGS. 6 and 8.

Figure 5:
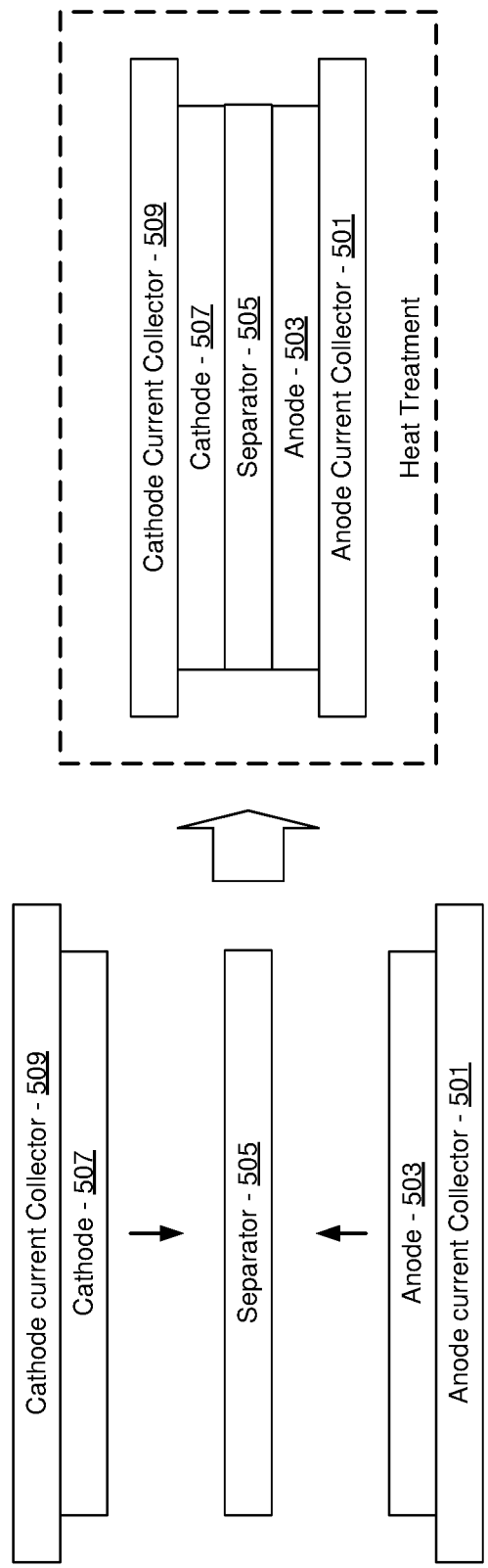
FIG. 5 illustrates an example process for forming solid state cells using direct coating based whole cell heat treatment, in accordance with an example embodiment of the disclosure.

FIG. 5 illustrates an example process for forming solid state cells using direct coating based whole cell heat treatment, in accordance with an example embodiment of the disclosure. Shown in FIG. 5 are various components that may be used in forming a cell using whole cell processing-namely, an anode current collector 501, an anode 503 a separator 505, a cathode 507, and a cathode current collector 509, and the direct coating based process for forming the whole cell using these components. Each of these components may be substantially similar to the corresponding components of the battery 100, as described with respect to FIG. 1. However, the components shown in FIG. 5 may be configured for supporting whole cell processing.

In this regard, in whole cell processing a heat treatment process is applied to a whole cell structure, which comprises at least the cathode and the anode (and, often, at least the separator as well), at the same time. The heat treatment may cause concurrent changes to material in the whole cell structure—e.g., converting precursor material to active material for both of the cathode and the anode. The heat treatment may comprise pyrolysis. However, the disclosure is not limited to pyrolysis. This may be preferable to the approach in existing solutions, where the electrodes are made separately (e.g., with pyrolysis being performed separately for each of the electrodes), and cells are then formed using these separately-made electrodes. With whole cell processing, the electrodes (cathode and anode) are processed at the same time, using a single heat treatment (e.g., pyrolysis) process—that is, the cell forming heat treatment (or backing of the cell) is done in one step. In other words, with whole cell processing, the cathode and anode are pyrolyzed at the same time, preferably by using the same binder/resin in the cathode and anode slurries, so that cell (including anode precursor, separator precursor, and cathode precursor) may be formed (e.g., baked) in one step.

A whole cell system (comprising at least the anode and the cathode, but typically additionally comprising at least the separator) is processed at the same time, using a single heat treatment (e.g., pyrolysis) process. For example, a whole cell system may comprise at least anode, separator, and cathode precursors (e.g., slurries), all heat treated at the same time, thus allowing for pyrolyzing both electrodes (cathode and anode) at the same time. The heat treatment (e.g., pyrolysis) process may be employed through a direct coating or lamination manufacture of the whole cell system. FIG. 5 illustrates direct coating based whole cell processing.

In this regard, with direct coating based approach the anode material (e.g., slurry) 501 and the cathode material (e.g., slurry) 507 are coated respectively onto the anode current collector 509 and the cathode current collector 511. Each of the cathode and anode slurries may comprise active material, binder/resin (e.g., PI, PAI, etc.), solvent, and (optionally) conductive carbon. The coated anode (on the anode current collector) and coated cathode (on the cathode current collector) may then be assembled with the separator, thus forming a whole cell structure.

The entire coated assembly (coated cathode and anode assembled with the separator) may then be heat treated, using a specialized direct coating based heat treatment (e.g., pyrolysis) process for forming the whole cell. In this regard, the presence of current collectors may necessitate use of lower temperature than would be possible if the current collectors where not included. In this regard, some of metals that may be used in current collectors (e.g., Aluminum) may have relative low melting temperature, and as such the heat treatment may need to be configured to ensure that such temperature is not exceeded (or even reached). For example, when applying pyrolysis process on the whole cell (including cathode and its current collector, separator, anode and its current collector), the pyrolysis process may be performed at 500-800° C. for 1-3 hours in Argon (Ar)/Nitrogen (Ni) atmosphere (or, alternatively, the pyrolysis may be done under vacuum).

Figure 6:
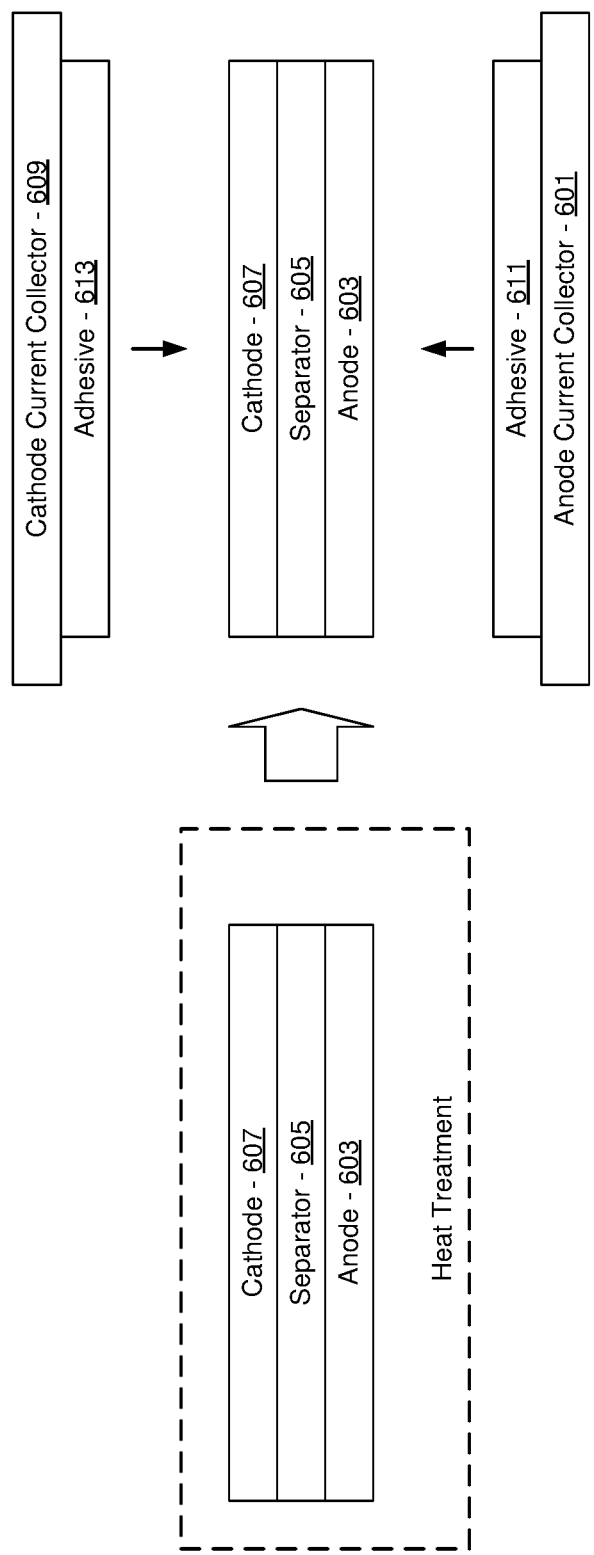
FIG. 6 illustrates an example process for forming solid state cells using lamination based whole cell heat treatment, in accordance with an example embodiment of the disclosure.

FIG. 6 illustrates an example process for forming solid state cells using lamination based whole cell heat treatment, in accordance with an example embodiment of the disclosure. Shown in FIG. 6 are various components that may be used in forming a cell using whole cell processing-namely, an anode current collector 601, an anode 603, a separator 605, a cathode 607, and a cathode current collector 609, and the lamination based process for forming the whole cell using these components. Each of the components may be substantially similar to the similarly-named components as described with respect to FIG. 5. However, the components shown in FIG. 6 may be configured for supporting lamination based whole cell processing.

In this regard, as noted above, in whole cell processing the whole cell structure may be heat treated at the same time. For example, a single heat treatment (e.g., pyrolysis) process is applied to a whole cell, at the same time, with heat treatment (e.g., pyrolysis) process being employed through a direct coating or lamination manufacture of the whole cell system. FIG. 6 illustrates lamination based process. In this regard, with lamination based approach the anode material (e.g., slurry) 601 and the cathode material (e.g., slurry) 607 are coated each side of the separator 605. As noted above, with respect to FIG. 5, each of the cathode and anode slurries may comprise active material, binder/resin (e.g., PI, PAI, etc.), solvent, and (optionally) conductive carbon.

The whole cell structure, comprising the separator 605 with the coated anode 603 and coated cathode 607, is then heat treated, using a specialized lamination based heat treatment (e.g., pyrolysis) process. For example, the lamination based pyrolysis process of the whole cell structure (including the cathode, the separator, and the anode) may be performed at 500-1200° C. for 1-3 hours in Ar/Ni atmosphere (or, alternatively, under vacuum). Noticeably, the lamination based pyrolysis may be done at higher temperature compared to the direct coating based pyrolysis, as the current collectors are not included in the whole cell structure-rather, they are added after pyrolysis.

After the pyrolysis is completed, the whole cell may be formed, by assembling the pyrolyzed whole cell structure (cathode, anode, and separator) with the anode current collector 601 and the cathode current collector 609. In this regard, the anode current collector 601 and the cathode current collector 609 may be first coated with adhesive layers 611 and 613, comprising, e.g., PAI or other adhesive polymer, and the whole cell system may then be laminated in a heat press (or, alternatively, using a roll or flat press).

As noted above, the cathode and anode slurries (precursors) used in whole cell processing (e.g., anode 503 and cathode 507 in FIG. 5; anode 603 and cathode 607 in FIG. 6) may comprise electrode active materials, binder/resin material (e.g., polyimide (PI), polyamide-imide (PAI)), solvent, and (optionally) conductive carbon. The anode (specifically the active material thereof) may comprise silicon. However, the disclosure (and whole cell processing) is not limited to silicon-based anodes. Because of characteristics of silicon-dominated anodes (e.g., due to silicon expansion/contraction during lithiation/delithiation), where such anodes are used, the whole cell structures may incorporate remedial measures for accounting for such characteristics. Similarly, the heat treatment (e.g., pyrolysis) process may be adjusted to account for these characteristics.

The cathode and anode slurries may be the same for both techniques—that is, for both direct coating based processing and transfer lamination based processing. To ensure that the whole cell system (including anode precursor, separator precursor, and cathode precursor) is pyrolyzed at the same time, the same polymer (binder/resin) may be used in the cathode and anode slurries.

In some instances, the slurries may be adjusted for the different techniques. For example, because lower temperature is used with direct coating compared to transfer lamination (thus resulting in less carbon burn up), more carbon may be included in the cathode and anode slurries used in direct coating based processing, to ensure similar conductive characteristics in the manufactured whole cells with either technique.

Different types of electrolytes may be used in whole cell processing, including both solid state and liquid electrolytes. In different implementations electrolytes may be added after the pyrolysis of the whole cell system, or may be added before pyrolysis, such as by adding them into whole cell structures and as such getting processed (e.g., heat treated) with the whole structure during the heat treatment (e.g., pyrolysis) process. For example, in some implementations liquid electrolytes may be used. In this regard, liquid electrolytes may be injected into the cell after the pyrolysis of the whole cell system. This may be possible where the solid state electrolyte is porous (or may become porous in the whole cell after formation, such as a result of the heat treatment). Such porosity allows for injection of liquid electrolyte into the cell after (or in the course of) formation.

Alternatively, solid state electrolytes may be used. For example, solid state electrolyte may be included in the cell matrix subject to the heat treatment (e.g., included in the whole cell structure that is heat treated). Use of solid state electrolytes may be desirable because compared to liquid electrolytes the solid state electrolytes may improve safety (being less flammable), both during processing/forming and during use of formed cells), and may improve cycle life performance. For example, a ceramic binder containing Li may be used, which may help in promoting Li ion conductivity in electrodes. When using solid state electrolyte, the electrolytes may be included in different components of the cell (e.g., in each of the cathode, anode, and separator). In this regard, different solid electrolytes may be used in each of these components. In an example implementation, multiple layers of solid state electrolyte may be used.

In some example implementations, both types (liquid and solid state) of electrolytes may be used. For example, solid state electrolytes may be included in the cell matrix and heat treated during pyrolysis of the whole cell, and then after pyrolysis, liquid electrolyte may be injected into the cell after forming.

In various implementations, a cell/electrode matrix optimized for improving performance may be used for cells formed using whole cell processing. For example, inorganic materials (e.g., ceramic materials) may be used in the whole cell body, and may act as scavengers as part of the cell matrix in the anode, separator, and cathode. In this regard, many inorganic material or compounds (e.g., metal oxides) may be excellent scavengers, thus when included in the inorganic layer may allow the layer to act as a scavenger for such detrimental chemicals as $H_2O$ or HF. Also, hard or soft carbon may be added in the matrix material for the anode and cathode. For example, carbon burnout during the pyrolysis process may improve conductivity (and this cell performance). Further, silicone may be added in the matrix material for the separator, as it would turn into $SiO_x$ material due to the pyrolysis process, which would also help improve performance. The matrix may also be configured to enable forming of solid state cells—that is, with solid state electrolyte (rather than liquid electrolyte). This may be done by using ceramic polymers/binders containing Li which would help in promoting Li-ion conductivity in electrodes in the absence of liquid electrolyte.

In some example implementations, the electrolyte, anode and cathode may include sintered ceramic electrolyte (e.g., $Li_7La_3Zr_2O_{12}$ (LLZO), lithium aluminum germanium phosphate (LAGP), or other commercially available solid electrolyte powders). For example, electrolyte films or layers comprising LLZO and low yield binder such as polyvinyl butyral (PVB) may be incorporated into the cell matrix that is used in whole cell processing. In this regard, once subjected to sufficiently high temperature (as would be the case during the pyrolysis process), the binder would outgas gradually allowing LLZO powders to sinter into a thin film. A similar concept may be used with the anodes, where silicon (Si) powders may be sintered into thin films using sintered LLZO as matrix, and the cathodes where cathode active material (e.g., NCM622) may be formed into a film using sintered LLZO as matrix. Further, left over carbon from pyrolysis of the binder (e.g., PVB) may provide electrical conductivity to the electrodes by design.

The separator used in whole cell processing (e.g., the separator 505 in FIG. 5, the separator 605 in FIG. 6) may preferably comprise ceramic materials or other materials that can be stable at pyrolysis temperature used in whole cell processing (e.g., 500° C.). The separator may also include solid state electrolytes, as explained in more detail below. Various options may be used for the current collectors used in whole cell processing (e.g., the anode current collector 501 and the cathode current collector 509 in FIG. 5; the anode current collector 601 and the cathode current collector 609 in FIG. 6). For example, the cathode current collector may comprise Aluminum (Al), carbon coated Al, stainless steel, etc.; the anode current collector may comprise copper (Cu), carbon coated Cu, stainless steel, Nickel (Ni), etc.

Figure 7:
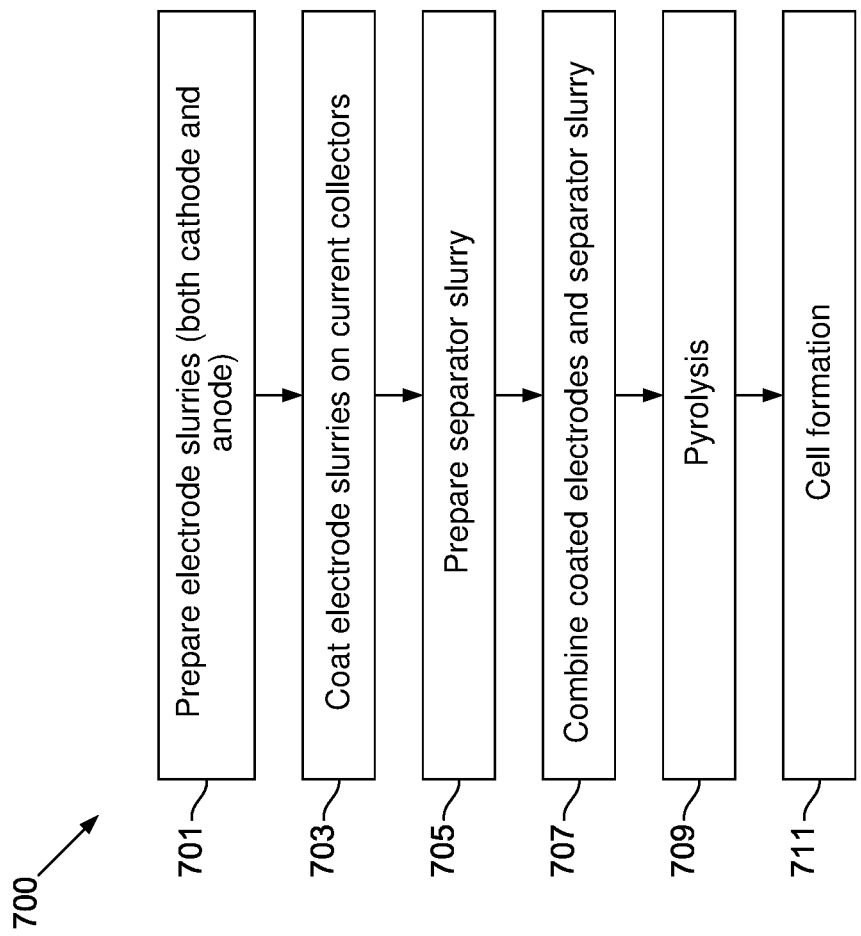
FIG. 7 is a flow diagram of a process for direct coating based whole cell processing, in accordance with an example embodiment of the disclosure.

FIG. 7 is a flow diagram of a process for direct coating based whole cell processing, in accordance with an example embodiment of the disclosure.

In step 701, electrode slurries for both of the cathode and the anode may be prepared, such as by mixing electrode active material using a binder/resin (such as PI, PAI, PVB, etc.), solvent, and conductive carbon.

In step 703, the electrode slurries may be coated on corresponding current collectors. The collectors may comprise metal foil. The coated electrodes may undergo additional processing steps (e.g., drying, calendering, etc.).

In step 705, separator slurry may be prepared. For example, the separator slurry may comprise ceramic materials or other materials that can be stable at pyrolysis temperature used in whole cell processing (e.g., 500° C.). The separator may also include solid state electrolytes. In some instances, solid state electrolytes may also be included in the electrode slurries.

In step 707, the coated electrodes and the separator slurries may be combined to form a whole cell structure (or system).

In step 709, the whole cell structure may be pyrolyzed, such as by heating it to 500-800° C., for 1-3 hours, in Argon (Ar)/Nitrogen (Ni) atmosphere (or, alternatively, in vacuum). The pyrolysis causes the carbon precursors to partially or completely burn (and convert into, e.g., glassy carbon). The pyrolysis step may result in whole cell material, which may be used to form a cell in step 711.

Figure 8:
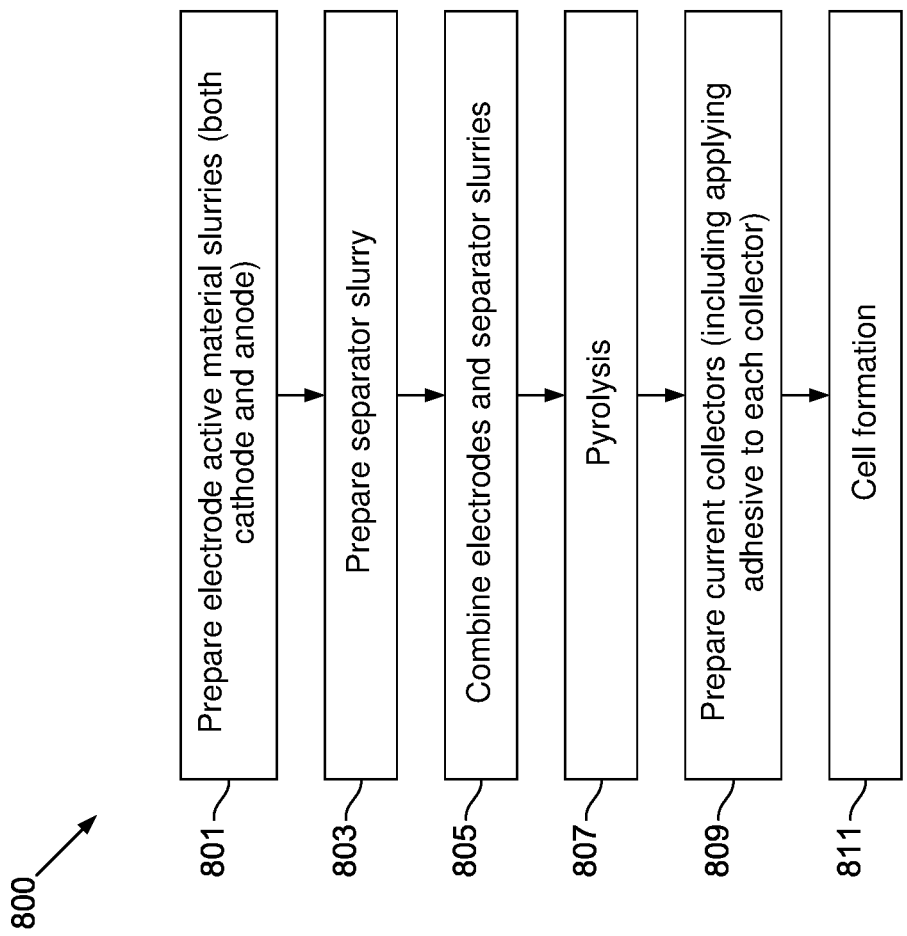
FIG. 8 is a flow diagram of an alternative process for transfer lamination based whole cell processing, in accordance with an example embodiment of the disclosure.

FIG. 8 is a flow diagram of an alternative process for transfer lamination based whole cell processing, in accordance with an example embodiment of the disclosure.

In step 801, electrode slurries for both of the cathode and the anode may be prepared, such as by mixing electrode active material using a binder/resin (such as PI, PAI, PVB, etc.), solvent, and conductive carbon.

In step 803, separator slurry may be prepared. For example, the separator slurry may comprise ceramic materials or other materials that can be stable at pyrolysis temperature used in whole cell processing (e.g., 500° C.). The separator may also include solid state electrolytes. In some instances, solid state electrolytes may also be included in the electrode slurries.

In step 805, the electrode slurries and the separator slurry may be combined to form a whole cell structure (or system).

In step 807, the whole cell structure may be pyrolyzed, such as by heating it to 500-800° C., for 1-3 hours, in Argon (Ar)/Nitrogen (Ni) atmosphere (or, alternatively, in vacuum), creating a pyrolyzed whole cell structure. The pyrolysis causes the carbon precursors to partially or completely burn (and convert into, e.g., glassy carbon).

In step 809, the current collectors (for both of the cathode and the anode) may be prepared. The collectors may comprise metal foil. Preparing the electrode collectors may include applying adhesive layers (e.g., adhesive polymer, such as PAI) to them.

In step 811, cell formation is done, such as by assembling the pyrolyzed whole cell structure with the current collectors, with the cell being formed such as by laminating the resultant combined structure—e.g., in heat press or the like.

In some instances, atmosphere conditions during the whole cell heat treatment (e.g., pyrolysis) process may be controlled, to optimize performance. In this regard, the various components in the whole cell structure may have different atmosphere requirements and/or considerations. Atmosphere requirements and/or considerations may also differ between different types of processes—e.g., lamination based pyrolysis vs. direct coating based pyrolysis. For example, anodes typically comprise material may be oxidized whereas cathodes typically comprise material that may reduce (in the context of the reduction-oxidation reaction). Thus, the anodes and cathodes components may have different atmosphere requirements (for optimal performance, as different conditions are optimal/suitable for oxidation and reduction), and as such different considerations may need to be given to the atmosphere conditions for these components. In this regard, the atmosphere for the anode may have be free (or significantly free) of oxygen, whereas the cathode may not be susceptible to and affect by presence of oxygen. Thus, only the atmosphere of the anode may need to be controlled to remove all (or most) oxygen.

In some implementations, the different atmosphere requirements and/or considerations may be addressed by flowing different gases through (or between) the different areas, corresponding to the different components. This may be particularly suitable or possible where there may be physical separation between the areas corresponding to these different components, such as when using a solid state separator, which allows for creating different atmospheres for the anode and cathode. Alternatively, a common atmosphere that is may accommodate different requirements may be used. For example, in some implementations inert atmosphere may be used, being specifically configured for preventing material in each area from affecting other areas.

In an example implementation, issues relating to the different atmospheric requirements may be addressed by having one of the components (e.g., the cathode) synthesized from the precursor. For example, instead of using a cathode comprised of metal oxide, precursors that include material that would form (synthesize) the cathode during the pyrolysis processing are used. This may allow for optimizing conditions for oxidation that would take place in the anode processing without affecting the forming of the cathode.

In some instances, heat treatment may comprise be applied at different temperatures to different areas in the whole cell structure—e.g., corresponding to the different components. This may be particularly suitable or possible where there may be physical separation between the areas corresponding to these different components, such as when using a solid state separator, which applying heat treatment at different temperatures to the anode and cathode.

While not specifically shown in FIGS. 5-8, a furnace is utilized to conduct the heat treatment (e.g., pyrolysis) process. In this regard, such furnace may be configured for supporting the requirements of heat treatment (e.g., pyrolysis) process for whole cell processing in accordance with the present disclosure. For example, the furnace may be configured to heat the material (e.g., the cell matrix) within the required temperature range, to perform the heat treatment with the timing requirements for the heat treatment (e.g., pyrolysis) process, to create the required atmosphere conditions, etc. The furnace may incorporate and/or support various thermal sources (including, e.g., thermal rods, multiple thermal sources, etc.). Further, the furnace may be configured for monitoring conditions within the furnace and/or for controlling heating related functions, to ensure optimal pyrolysis. As such, the furnace may incorporate components (e.g., sensors, control circuitry, etc., not shown) to provide the necessary sensory and control functions.

Accordingly, solutions based on the current disclosure may allow for cell forming using whole cell processing whereby a whole cell (comprising at least the anode and the cathode) is heat treated, and as such formed using a single heat treatment (e.g., pyrolysis) process—that is, one step. These solutions yield various improvements over existing solutions. For example, whole cell processing (and cell forming based thereon) may achieve cost savings as well as cell performance improvement, as all layers are adhered together in one heat treatment (e.g., pyrolysis) process, which may result in stronger adhesion, enhanced interfaces, and a cell with excellent electrolyte wetting. Further, whole cell processing (and cells formed based thereon) may allow for improved safety, both during manufacturing process and during use—e.g., due to eliminating or reducing use of liquid electrolyte(s).

These solutions also may allow for improvements due to support for use of different electrolytes. In this regard, while solid state electrolytes may typically be used in cells formed using the whole cell processing as described herein, use of liquid electrolytes (in lieu of, or in conjunction with use of solid state electrolytes) is also supported. For example, as noted above, in some instances, combinations of solid and liquid electrolyte may be used (e.g., where the solid material is porous). This may be desirable as it may allow for adaptively altering the amount of electrolytes to vary what may otherwise be similar cells-being manufactured using the same solid state electrolyte content.

An example method for forming a battery, in accordance with the present disclosure, comprises applying pyrolysis process to a whole cell composition, with the whole cell composition comprising, at least, both anode material and cathode material.

In an example embodiment, the method further comprises controlling one or more parameters of the pyrolysis process based on a type of the pyrolysis process.

In an example embodiment, the type of the pyrolysis process may comprise one of directed coating and lamination, and controlling the one or more parameters of the pyrolysis process may comprise setting a temperature of the pyrolysis process.

In an example embodiment, the method further comprises setting temperature of the pyrolysis process more less than 800° C. when the type of the pyrolysis process is direct coating; and setting temperature of the pyrolysis process less than 1200° C. when the type of the pyrolysis process is lamination.

In an example embodiment, the method further comprises combining, after the pyrolysis process, the whole cell composition with an anode current collector and a cathode current collector, to create a complete whole cell composition, and laminating the complete whole cell composition to form the battery.

In an example embodiment, the method further comprises coating an adhesive layer on each of the anode material current collector and the cathode material current collector before combining with the whole cell composition.

In an example embodiment, laminating the complete whole cell composition comprising applying at least one of heat press, roll press, and flat press.

In an example embodiment, the method further comprises controlling atmosphere conditions of the pyrolysis process based on content of the whole cell composition.

In an example embodiment, controlling the atmosphere conditions comprises flowing different gases through or between different areas within the whole cell composition, the different area comprising at least areas corresponding to the anode material and the cathode material.

A whole cell composition for use in whole cell forming, in accordance with the present disclosure, comprises anode material and cathode material, with the whole cell composition being configured for a single pyrolysis process in which both of the anode material and the cathode material are heat treated at the same time.

In an example embodiment, the whole cell composition further comprises a separator material, where the separator material is configured to be heat treated during the single pyrolysis process, at the same time as the anode material and the cathode material.

In an example embodiment, the whole cell composition further comprises at least one of an anode current collector and a cathode current collector, configured to be heat treated during the single pyrolysis process, at the same time as the anode material and the cathode material.

In an example embodiment, the whole cell composition further comprises solid state electrolyte.

In an example embodiment, the solid state electrolyte comprises ceramic electrolytes comprising one or more of $Li_7La_3Zr_2O_{12}$ (LLZO) and lithium aluminum germanium phosphate (LAGP)

In an example embodiment, the whole cell composition further comprises a binder.

In an example embodiment, the binder comprises one or more of polyimide (PI), polyamide-imide (PAI), and polyvinyl butyral (PVB).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" or "configurable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A whole cell composition for use in whole cell forming, comprising:
   anode material;
   cathode material; and
   separator material;
   wherein:
   the anode material, the cathode material, and the separator material are configured to convert into, respectively, an anode, a cathode, and a separator of a whole cell, at the same time during a single heat treatment, wherein the single heat treatment is characterized by a first set of heat treatment conditions that are applied simultaneously to each of the anode material, the cathode material, and the separator material.

2. The whole cell composition of claim 1, wherein the separator material converts to form non-conductive separator based on or during the single heat treatment.

3. The whole cell composition of claim 1, further comprising at least one of an anode current collector and a cathode current collector that is heat treated during the single heat treatment, at the same time as the anode material and the cathode material.

4. The whole cell composition of claim 1, further comprising solid state electrolyte.

5. The whole cell composition of claim 4, wherein the solid state electrolyte comprises ceramic electrolytes comprising one or more of $Li_7La_3Zr_2O_{12}$ (LLZO) and lithium aluminum germanium phosphate (LAGP).

6. The whole cell composition of claim 4, wherein solid state electrolyte is or becomes porous.

7. The whole cell composition of claim 1, wherein one or both of the anode material and the cathode material further comprise a binder.

8. The whole cell composition of claim 7, wherein the binder comprises one or more of polyimide (PI), polyamide-imide (PAI), and polyvinyl butyral (PVB).

9. The whole cell composition of claim 1, wherein the single heat treatment is conducted at temperature at or above 400° C.

10. The whole cell composition of claim 1, wherein the first set of heat treatment conditions comprise conducting the single heat treatment at a preset temperature or temperature range.

* * * * *